United States Patent
Goto

(10) Patent No.: US 8,508,583 B2
(45) Date of Patent: Aug. 13, 2013

(54) THREE-DIMENSIONAL CYLINDRICAL VIDEO IMAGE PROJECTING DEVICE AND METHOD

(75) Inventor: Kunio Goto, Fukuoka (JP)

(73) Assignee: PBsystems, Inc., Fukuoka (JP)

( * ) Notice: Subject to any disclaimer, the term of this patent is extended or adjusted under 35 U.S.C. 154(b) by 12 days.

(21) Appl. No.: 12/566,493

(22) Filed: Sep. 24, 2009

(65) Prior Publication Data

US 2010/0066818 A1 Mar. 18, 2010

Related U.S. Application Data

(63) Continuation-in-part of application No. PCT/JP2008/059139, filed on May 19, 2008.

(30) Foreign Application Priority Data

May 19, 2007 (JP) ................................. 2007-133562

(51) Int. Cl.
*H04N 13/02* (2006.01)
*G03B 35/00* (2006.01)

(52) U.S. Cl.
USPC ............................................. 348/48; 352/57

(58) Field of Classification Search
USPC ............................................ 348/48; 352/57
See application file for complete search history.

(56) References Cited

U.S. PATENT DOCUMENTS

| | | | | |
|---|---|---|---|---|
| 4,151,549 A | * | 4/1979 | Bautze | 348/44 |
| 6,144,809 A | * | 11/2000 | Inaba | 396/326 |
| 6,431,989 B1 | | 8/2002 | Katayama et al. | |
| 2002/0067465 A1 | * | 6/2002 | Li | 352/57 |
| 2005/0140568 A1 | | 6/2005 | Inazumi | |
| 2006/0152680 A1 | * | 7/2006 | Shibano | 353/30 |

FOREIGN PATENT DOCUMENTS

| | | |
|---|---|---|
| CN | 1627177 | 6/2005 |
| JP | 3-48233 | 3/1991 |
| JP | 3-58082 | 3/1991 |
| JP | 2000-132082 | 5/2000 |
| JP | 2004-072623 | 3/2004 |
| JP | 2005-175786 | 6/2005 |
| JP | 2005-352027 | 12/2005 |

* cited by examiner

*Primary Examiner* — Richard Torrente
(74) *Attorney, Agent, or Firm* — Jordan and Hamburg LLP

(57) ABSTRACT

A three-dimensional video image projecting device and projecting method uses video image projectors to project a three-dimensional video image on a cylindrical screen face which can be three-dimensionally viewed through three-dimensional glasses having a first polarizing filter and a second polarizing filter arranged thereon. A plurality of video image projectors are disposed to be opposed to respective regions of the screen face, and the video image projectors produce a continuous, three-dimensional video image in a circumferential direction, by projecting, from the video image projectors, three-dimensional video images, each of which has an angle of 30 degrees or less in a circumferential direction of the screen face, arranged along the circumferential direction of the screen face.

5 Claims, 6 Drawing Sheets

Fig. (1)
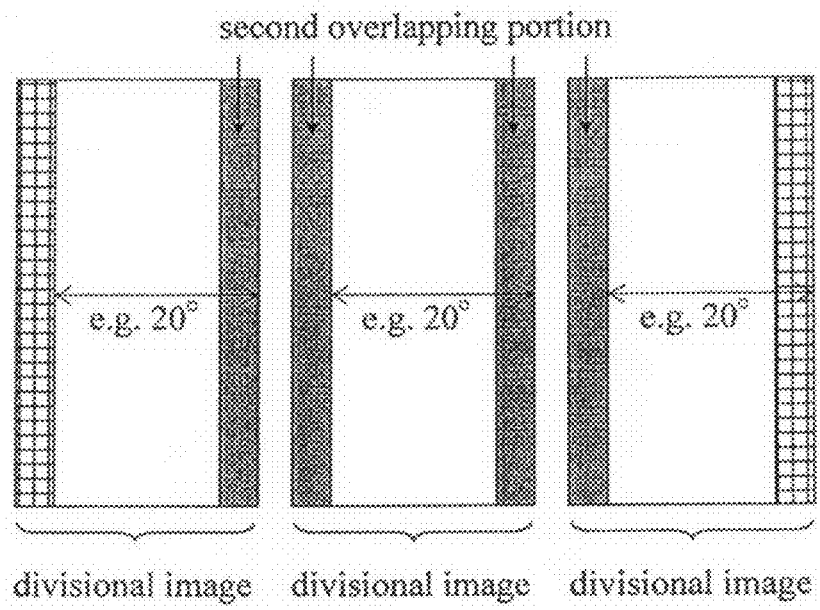

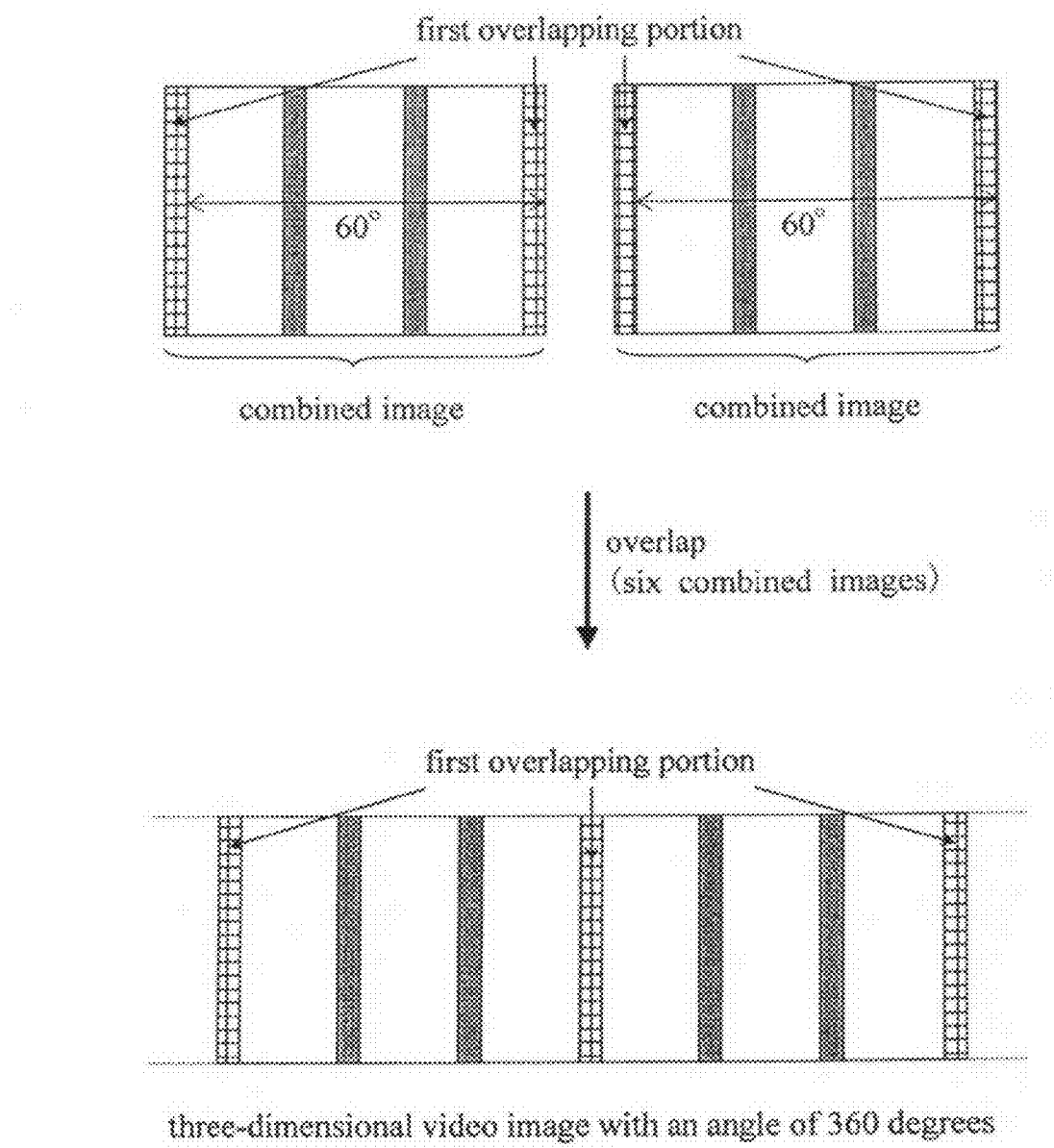

Fig. (3)
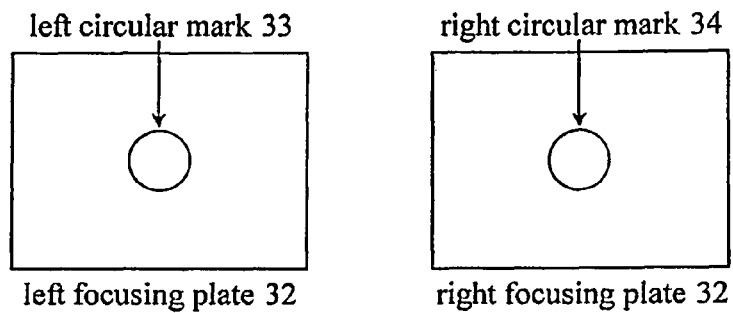
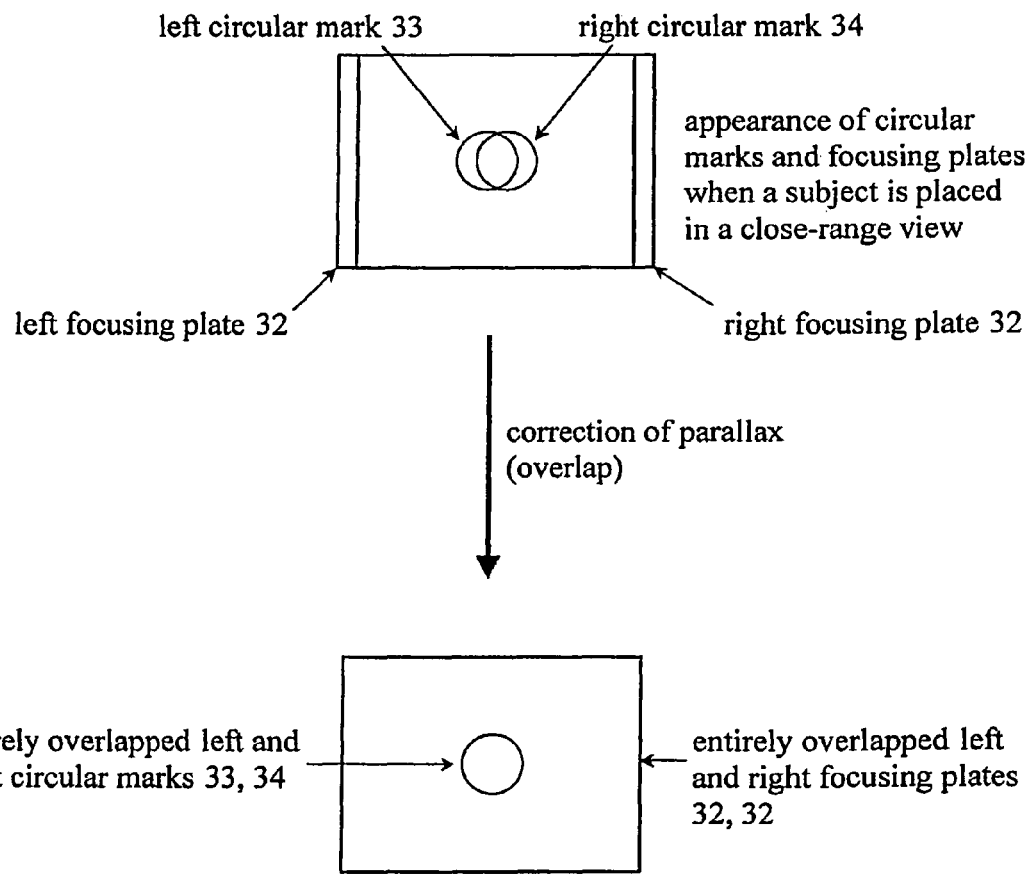

SUPERIMPOSED REGISTRATION VIDEO IMAGE

REGISTRATION VIDEO IMAGE OF FIRST VIDEO IMAGE PROJECTOR 20a

REGISTRATION VIDEO IMAGE OF SECOND VIDEO IMAGE PROJECTOR 20b

THREE-DIMENSIONAL CYLINDRICAL VIDEO IMAGE PROJECTING DEVICE AND METHOD

CROSS-REFERENCE TO RELATED APPLICATION(S)

This application is a Continuation-in-Part of International Application No. PCT/JP2008/059139 filed on May 19, 2008, which claims the benefit of Japanese Patent Application No. 2007-133562 filed on May 19, 2007.

TECHNICAL FIELD

The present invention relates to a three-dimensional video image projecting device and a three-dimensional video image projecting method, and in particular, to a three-dimensional video image projecting device and a three-dimensional video image projecting method which are capable of projecting a continuous, three-dimensional video image with an angle of 360 degrees in a horizontal direction.

BACKGROUND ART

Conventionally, a variety of methods have been proposed for projecting a three-dimensional video image to three-dimensionally show a video image. In particular, recently, owing to the promotion of technology development of various types of equipment, there have been proposed methods for projecting a three-dimensional image, using three-dimensional liquid crystal display devices or liquid-crystal shutter glasses as well as anagraphs employing so called three-dimensional viewing glasses using conventionally known blue and red films. Further, projection of three-dimensional video images using holograms becomes also known as a "practical-level" technique. Lately, in place of such blue and red films, there have also been employed three-dimensional viewing glasses having provided thereon two types of polarizing filters of which polarizing conditions are different from each other.

However, in such a method for projecting three-dimensional video images, in the case of constructing a system which realizes simultaneous viewing at a comparatively modest price and by a large number of viewers, the projecting method using three-dimensional viewing glasses is cost-efficient, and has been utilized in planetariums or the like.

Further, there has been proposed a simulation ride device for projecting video images from a plurality of projectors on screens formed in the recessed spherical shape instead of three-dimensional video images, thereby displaying high-definition, three-dimensional video images (see Patent Document 1, for example).

Patent Document 1: Japanese Laid-open Patent Application No. 2000-132082

DISCLOSURE OF THE INVENTION

Problems to Be Solved by the Invention

However, the three-dimensional video images, obtained by these projecting methods, can be viewed as three-dimensional video images, whereas the edges of screens or displays can also be viewed or the three-dimensional video images per se are small in size, thus degrading a feeling of being immersed in a pseudo space with the three-dimensional video images.

Therefore, viewers cannot have the feeling that they exist in a virtual space expressed as a three-dimensional video image, which has been no better than a state in which they are viewing an ordinary two-dimensional images such as a cinema.

In view of the above-described circumstance, the present inventor, et al. made the present invention by providing three-dimensional video images with a high feeling of being immersed, thereby making research and development so as to allow viewers to be invited to a virtual space very easily and to have an experience of video image viewing which is different from the conventional one.

Means for Solving the Problem(s)

The present invention provides a three-dimensional video image projecting device which includes
a screen formed in a cylindrical shape with an inner circumferential face being a screen face, and
a plurality of video image projectors projecting on the screen three-dimensional video images which can be three dimensionally viewed through three-dimensional viewing glasses having a first polarizing filter and a second polarizing filter arranged thereon.

An image data of three-dimensional video image projected from a respective one of the video image projectors is a combined-image data formed by combining a plurality of divisional-image data with an angle of 30 degrees or less in a circumferential direction on the screen face.

The plurality of video image projecting devices are provided to be opposed to the screen face, and to produce a continuous, three-dimensional video image in a circumferential direction by projecting three-dimensional video images, each of which has an angle of 30 degrees or less in a circumferential direction of the screen face, arranged horizontally along the circumferential direction of the screen face.

Further, the three-dimensional video image projecting device of the present invention has the features that:

(1) The three-dimensional video image projected from a respective one of the video image projectors is a three-dimensional video image projected based upon combined-image data formed by combining a plurality of divisional-image data as three-dimensional video images, a respective one of which has an angle of 30 degrees or less in a circumferential direction on the screen face;

(2) The combined-image data are combined, with an overlap portion being provided on divisional-image data which are adjacent to each other when divisional images are projected, and are produced with the overlap portion being adjusted to obtain predetermined luminance;

(3) The video image projectors are adapted to project video images, a respective one of which is superimposed on a superimposed portion of video image of three-dimensional video images projected adjacently in a circumferential direction, with a side-edge portion in the circumferential direction side of the three-dimensional video image projected on the screen face being a superimposed portion of video image;

(4) A respective one of the video image projectors has an adjustment mode for projecting a registration video image with a lattice-like pattern of predetermined pitches being formed on the screen face in order to perform registration with the three-dimensional video images projected adjacently;

a defective area including at least a defective part of the lattice-like pattern is provided at a superimposed portion of video image provided at a side-edge portion in the circumferential direction side of the registration video image; and the defective area is provided at a position which overlaps on the lattice-like pattern of the a superimposed portion of video image with a defective area of registration video images projected adjacently; and (5) A video image projector for projecting either one of a video image for a left eye and a video image for a right eye is adapted to project the lattice-like pattern in the registration video image with a first color; and a video image projector for projecting the other one of the video images is adapted to:

project the lattice-like pattern in the registration video image with a second color after superimposed on the lattice-like pattern of the first color;

project the lattice-like pattern of the second color in a defective area in a first registration video image projected as the lattice-like pattern of the first color;

project the lattice-like pattern of the first color in a defective area in a second registration video image projected as the lattice-like pattern of the second color;

superimpose a defective area in which the lattice-like pattern of the first color in a registration video image is projected adjacently on the defective area in which the lattice-like pattern of the second color is projected; and superimpose a defective area in which the lattice-like pattern of the second color in a registration video image is projected adjacently on the defective area in which the lattice-like pattern of the first color is projected; and (6) A blue filter is employed in place of the first polarizing filter, and a red filter is employed in place of the second polarizing filter.

The present invention provides a method for projecting a three-dimensional video image which includes the steps of disposing a screen formed of a cylindrical body with an inner circumferential face being a screen face, disposing the plurality of the video image projectors to be opposed to the screen face, producing combined image combining a plurality of divisional-image data with an angle of 30 degrees or less in a circumferential direction on the screen face, with image data being provided for three-dimensional video image made of a video image for a left eye and a video image for a right eye which are projected to be superimposed on each other on the screen so that they can be viewed through three-dimensional viewing glasses having a first polarizing filter and a second polarizing filter arranged thereon, and producing a continuous three-dimensional video image in a circumferential direction by projecting three-dimensional video images from a plurality of video image projectors a respective one of which has an angle of 30 degrees or less in a circumferential direction on the screen face, arranged horizontally along a circumferential direction of the screen face.

Advantageous Effect(s) of the Invention

According to the present invention, a method for projecting a three-dimensional video image and a device for projecting a three-dimensional video image showing a video image for a left eye and a video image for a right eye projected to be superimposed on each other on a screen by video image projectors, so that the three dimensional video image is viewed through three-dimensional viewing glasses having a first polarizing filter and a second polarizing filter arranged thereon, wherein:

the screen is formed of a cylindrical body with an inner circumferential face being a screen face; and a respective one of the plurality of video image projectors is disposed to be opposed to the screen face, and by projecting, from the video image projectors, three-dimensional video images, a respective one of which has an angle of 30 degrees or less in the circumferential direction on the screen face, arranged horizontally along a circumferential direction of the screen face, thereby allowing the method to project a three-dimensional video image which is continuous at an angle of 360 degrees in a horizontal direction and which is reasonable at a joint portion between the video images adjacent to each other.

Therefore, viewers of this three-dimensional video image can view the three-dimensional video image without being cognizant of the screen, thus allowing the viewers to enhance the feeling of being immersed in a virtual space with the three-dimensional video image and obtain a pseudo experience with its higher reality.

Moreover, in spite of the fact that the screen face has predetermined dimensions in the vertical direction, the vertical field of view is virtually extended by an object which can be viewed as if it were at a side closer to viewers than the screen face by means of a three-dimensional video image projected on the screen face. This allows the viewers to be incognizant of the existence of the screen and allows a highly immersive virtual space to be produced without providing the screen upwardly of the viewers.

BRIEF DESCRIPTION OF THE DRAWINGS

FIG. 1 It is a schematic perspective view of a three-dimensional video image projecting device according to an embodiment of the present invention.

FIG. 2 It is a schematic plan view of the three-dimensional video image projecting device according to the embodiment of the present invention.

FIG. 3 It is a schematic cross sectional view of the three-dimensional video image projecting device according to the embodiment of the present invention.

DESCRIPTION OF REFERENCE NUMERALS

Figure 4:
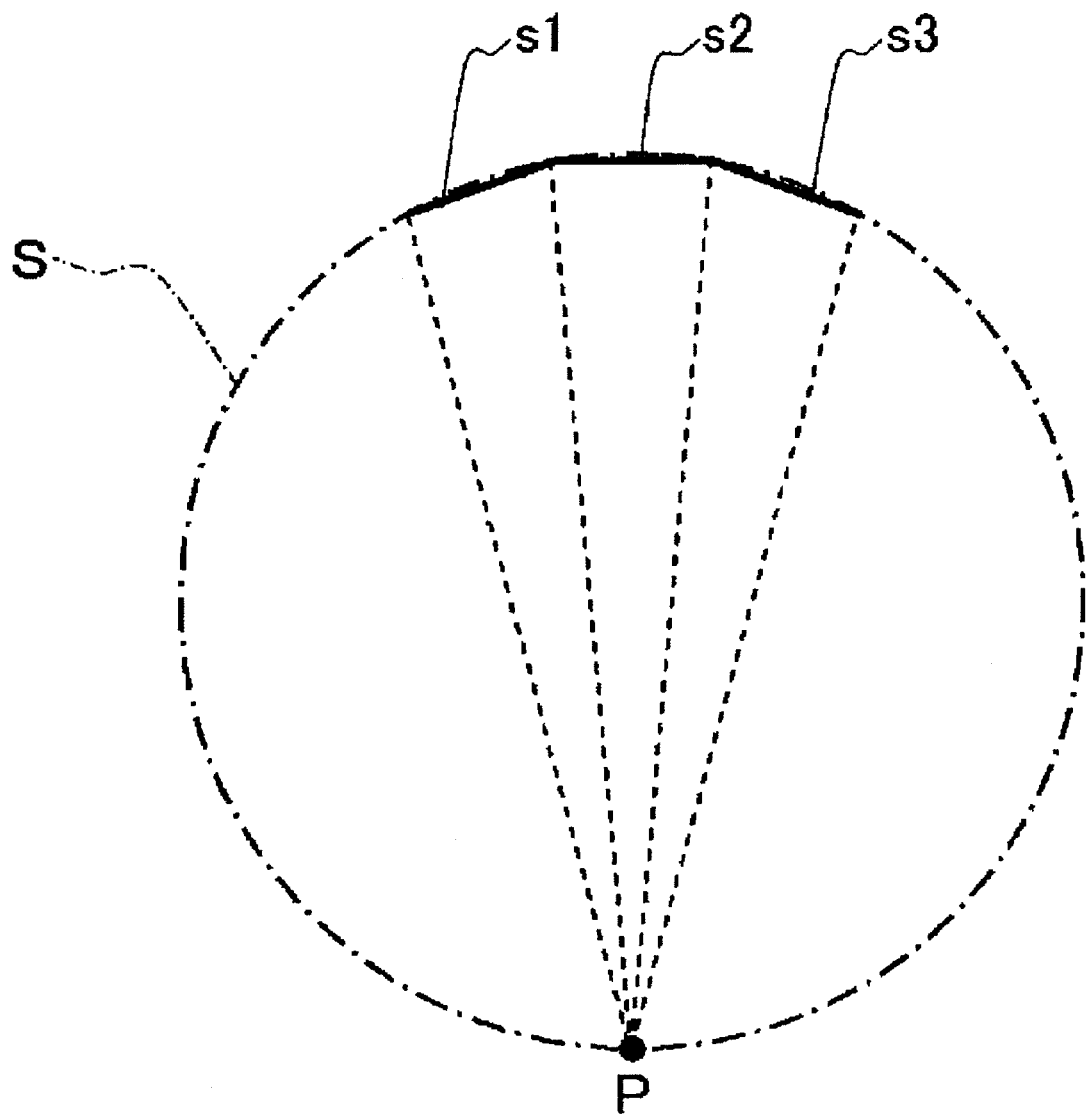
FIG. 4 It is an explanatory view of a method for producing divisional-image data.

S Screen face
10 Screen
20 Set of video image projectors
20a First video image projector
20b Second video image projector
30 Seat
31 Step
32 Handrail
33 Slope

BEST MODE FOR CARRYING OUT THE INVENTION

A three-dimensional video image projecting method and a three-dimensional video image projecting device of the present invention are adapted to show: a three-dimensional video image made of a video image for a left eye and a video image for a right eye, projected on a screen in a superimposed manner by means of video image projectors, through three-dimensional viewing glasses having a first polarizing filter and a second polarizing filter arranged thereon. In particular, each of a plurality of video image projectors are disposed to be opposed to a screen face, a screen is obtained as a cylindrical body with its inner circumferential face being the screen face; and three-dimensional video images are arranged and projected horizontally along the circumferential direction of the screen face, respectively, thereby projecting a continuous, three-dimensional video image in the circumferential direction.

That is, as shown in FIGS. 1 to 3, the three-dimensional video image projecting device, according to an embodiment of the present invention, is made up of: a cylindrical screen 10 with its inner circumferential face being a screen face S; and a plurality of video image projector sets 20, disposed to be opposed to the screen face S.

The video image projector set 20 is a pair of video image projectors, i.e., a first video image projector 20a for projecting a video image for the left eye and a second video image projector 20b for projecting a video image for the right eye. This video image projector set is adapted to produce one three-dimensional video image by superimposing the video image for the left eye and the video image for the right eye, projected by the first video image projectors 20a and the second video image projector 20b respectively, on the same area of the screen face S.

The first video image projector 20a and second video image projectors 20b are projectors of transmission-type, semi-transmission-type, reflection-type and the like using liquid crystal display units, which are generally referred to as "projectors", respectively. These projectors are intended to mount polarizing filters for applying a polarizing process, corresponding to the first polarizing filter and the second polarizing filter for the three-dimensional viewing glasses, respectively, and project video images, respectively, over these polarizing filters, thereby producing the video image for the left eye and that for the right eye.

In the embodiment, one three-dimensional video image is produced using two video image projectors, i.e., the first video image projector 20a and the second video image projector 20b. If possible, for example, in place of the video image projector set 20, there may be employed a video image projector exclusively used for three-dimensional images, which incorporates two light sources and two liquid crystal display units, thereby producing and projecting the video image for the left eye and the image for the right eye after the produced video image for the left eye and the produced video image for the right eye have been combined in a superimposed manner.

Further, while, in the embodiment, the first video image projector 20a and the second video image projector 20b are disposed above and below, these projectors may be disposed side by side. In particular, if they are disposed side by side, a heat generated by one of them may not affect the other projector, making it possible to easily prevent abnormal heating of the first video image projector 20a and the second video image projector 20b.

In the embodiment, 6 video image projector sets 20 are provided, each of which is adapted to project a three-dimensional video image in an area with 60 degrees of the screen having 360 degrees in the circumferential direction.

As three-dimensional video images to be projected from each of the video image projector sets 20, items of image data are stored and managed by means of a management unit (not shown). The management unit is adapted to enable projection by outputting the items of required image data as video image signals, respectively, and inputting the video image signals to the first video image projector 20a and the second video image projector 20b of each of the video image projector sets 20 via a required signal cable.

The management unit is an electronic computer such as a personal computer, and, in the embodiment, there are provided 3 personal computers which are operable in synchronism with each other. At each of the personal computers, 4 video image signal output terminals are provided enabling required video image signals to be output to 12 video image projectors 20a, 20b formed of 6 video image projector sets 20, respectively. These 3 personal computers are operated in synchronism with each other, thereby synchronizing the video image signals output from each of the video image signal output terminals and precluding problems such as the occurrence of distortion between the video image projectors 20a and 20b.

Each of the personal computers stores image data output to be converted to video image signals in storage means such as a hard disk; sequentially converts required image data to video image signals; and outputs the converted data from the video image signal output terminals.

In particular, in the embodiment, the storage means stores image data as combined-image data obtained by combining image data for 4 video image projectors 20a, 20b. At the time of conversion into video image signals, after a dividing process has been performed for dividing the combined-image data into items of image data, and the image data is converted to video image signals, allowing the converted signals to be output from each of the video image signal output terminals.

Each of the video image projector sets 20, as shown in FIG. 1, is disposed at an upper part of a screen face S which is opposed to the screen face S for projecting three-dimensional video images. The respective one of the video image projector sets 20 is disposed at the upper part of the screen face S, whereby the video image projector sets 20 never become obstacles, and moreover, the heat generated by the video image projector sets 20 can be readily released upwardly, making it possible to restrain a temperature rise in the space of the screen 10. The screen 10 is provided with an appropriate frame, thus making it possible to stably support each of the video image projector sets 20. The video image projector sets 20 may be arranged on floor, if possible, without being limitative to a case in which they are disposed at the upper part of the screen face S.

A seat 30 for viewer is provided inside of the cylindrical screen 10. At a part of the screen 10, an entrance (not shown) for access to the inside of the screen is provided, and further, an inner circumferential face of a door (not shown) for closing this entrance is also employed as a screen.

In the embodiment, at a portion of the seat 30, two circular steps 31 are provided concentrically to the cylindrical screen 10, and the seats 30 are provided in the shape of an arc at each of the steps. The seat 30 of the embodiment is made up of a frame body having an elastic member arranged thereon. In FIGS. 1 to 3, reference numeral 32 designates a handrail, and reference numeral 33 designates a slope.

In the video image projected by the thus configured three-dimensional video image projecting device, the screen face was formed on a circumferential face. Thus, the continuity at a joint between the three-dimensional video images adjacent to each other in the circumferential direction could not be sufficiently maintained in an ordinary projecting method.

In other words, in a case where ordinary video images are merely projected from the video image projector sets 20, when three-dimensional video images are superimposed in the circumferential direction by projecting three-dimensional video images, each of which has an angle of 60 degrees in the circumferential direction, by means of 6 video image projector sets 20, and the three-dimensional video images become continuous in the circumferential direction, it is identical to projecting video images, respectively, on 6 planar screens arranged in the circumferential direction. Further, the joint portion between the adjacent three-dimensional video images could not be continuously produced, whereby, at the joint portion, a displacement or a distortion occurred to the three-dimensional video image, eliminating its three-dimensional feel.

It was verified that a reasonable three-dimensional video image at the joint portion between the adjacent video images is obtained by further reducing the projection angle in the circumferential direction of one of the video image projectors 20*a*, 20*b*, for example, projecting an image with an angle of 30 degrees or less in the circumferential direction.

At this time, one of the video image projectors 20*a*, 20*b* is adapted to project a video image with an angle of 30 degrees in the circumferential direction. Namely, a total of 12 sets, i.e., a total of 24 video image projectors 20*a*, 20*b*, are required to display a continuous, three-dimensional video image with an angle of 360 degrees. Therefore, the three-dimensional video image projecting device becomes high in cost, resulting in an extremely increased burden upon a management unit for inputting the images projected by each of the video image projector sets 20 to the first video image projector 20*a* and second video image projector 20*b* of each of the video image projector sets 20.

For example, an image projected by one video image projector set 20 for projecting three-dimensional video images, each of which has an angle of 60 degrees in the circumferential direction, was projected as an image produced by combining the adjacent two images with each other in a case of projecting three-dimensional video images, each of which has an angle of 30 degrees in the circumferential direction. In the embodiment, the image projected by one video image projector set 20 was produced by 3 three-dimensional video images, each of which has an angle of 20 degrees in the circumferential direction.

Image data projected by one video image projector set 20 is referred to as "combined-image data", and image data employed to produce the combined-image data is referred to as "divisional-image data". In the present invention, what is displayed on a liquid crystal display unit provided in each of the first video image projector 20*a* and the second video image projector 20*b* of the video image projector set 20 is referred to as an "image", and what is displayed on the screen face S is referred to as a "video image".

Assuming that rectangular projection areas s1, s2, s3 are defined at their positions of the screen face S on which an image produced based upon the divisional-image data is to be projected, as shown in FIG. 4, items of the divisional-image data are produced in consideration of a positional relationship from a projection point P of the video image projector 20, i.e., the inclination of each of the projection areas s1, s2, s3 with respect to the projection direction.

Figure 5:
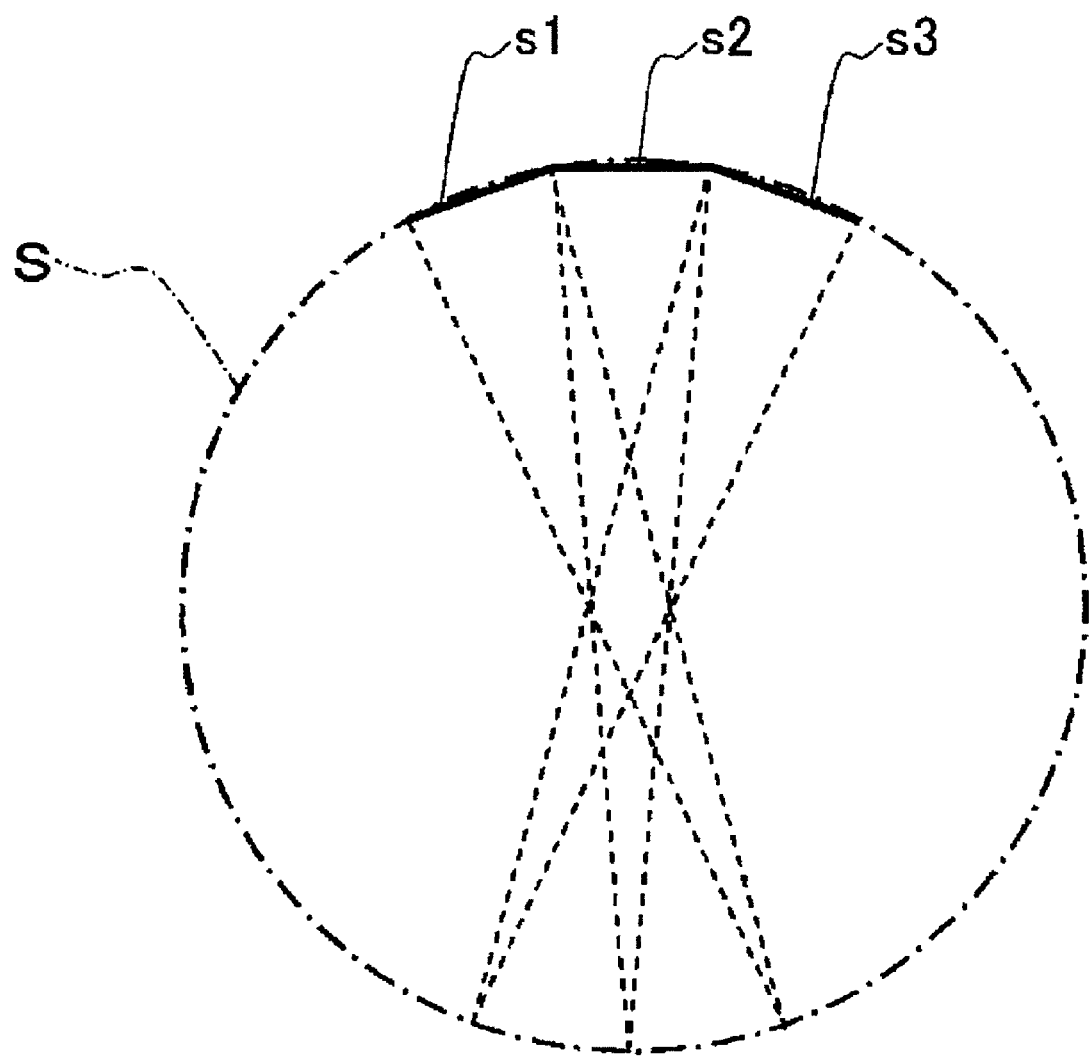
FIG. 5 It is an explanatory view of a method for producing divisional-image data.

In a case where a distance from the video image projector 20 to the screen face S is sufficiently long, the differences in inclinations among the projecting areas s1, s2, s3 with respect to the projection direction are reduced. Thus, as shown in FIG. 5, items of divisional-image data may be produced, assuming the projection areas s1, s2, s3 vertical to the projection direction in the same manner as that for ordinary image production, respectively.

At the time of producing each of the items of the divisional-image data, in order to provide an overlap portion with the image produced from the adjacent divisional-image data obtained as an image, the image data in an area larger, by this overlap portion, than that in each of the projection areas is produced, in place of producing image data for each projection area.

In respect of each item of the image data for the overlap portion, the relevant luminance is appropriately adjusted to obtain a predetermined luminance, with the overlap portions being provided in a superimposed manner on each other.

In the embodiment, combined-image data is obtained by combining 3 items of divisional-image data arranged in the circumferential direction, and the combined-image data is input as a video image signal from a management unit to either one of the first video image projector 20*a* and the second video image projector 20*b* of the video image projector set 20, allowing the input data to be displayed as a three-dimensional video image on the screen face S.

At this time, an overlap portion of video image is displayed at a side-edge portion on the circumferential direction side of the three-dimensional video image displayed on the screen face S, and the displayed video image is projected in a superimposed manner on a superimposed portion of video image of three-dimensional video images, projected adjacently in the circumferential direction, whereby the adjacent three-dimensional video images can be reasonably produced as a continuous, three-dimensional video image.

As described previously, while, in the embodiment, divisional-image data is produced as that projected at an angle of 20 degrees in the circumferential direction on the screen face S, combined-image data may be formed by combining a required number of items of divisional-image data with each other, the items of divisional-image data, each of which has an angle of 1 degrees, 2 degrees, 3 degrees, 4 degrees, 5 degrees, 6 degrees, 10 degrees, 12 degrees, 15 degrees, or 30 degrees in the circumferential direction on the screen face S, in a case where one video image projector set 20 projects a three-dimensional video image with the angle of 60 degrees in the circumferential direction.

It is desirable that the superimposed portion of video image is on the order of 10% in the circumferential direction of the three-dimensional image projected on the screen face S by means of each of the video image projector sets 20, and image data for a superimposed portion of video image may be appropriately adjusted at the time of producing the combined-image data.

As described above, in the three-dimensional video image projecting device of the embodiment, a plurality of video image projectors 20*a*, 20*b* are provided to be opposed to the screen face S, and three-dimensional video images, each of which has an angle of 30 degrees or less in the circumferential direction on the screen face S, are projected from the video image projectors 20*a*, 20*b* in such a manner that they are arranged along the circumferential direction of the screen face S, whereby a continuous, three-dimensional video image is produced in the circumferential direction. In this manner, a reasonable three-dimensional video image at a joint portion between the adjacent video images can be obtained.

Further, the three-dimensional video images, projected from each of the video image projectors 20*a*, 20*b*, are produced as those projected based upon the combined-image data formed by combining a plurality of divisional-image data obtained as three-dimensional video images, each of which has the angle of 30 degrees or less in the circumferential direction on the screen face S, thus making it possible to restrain increased cost of the three-dimensional video image projecting device and reduce a burden upon the management unit.

Furthermore, the combined-image data is combined with an overlap portion being provided on the adjacent divisional-image data at the time of projection, and is obtained as an image produced by adjusting the overlap portion to have its predetermined luminance, thus allowing the adjacent three-dimensional video images to be obtained as a continuous, reasonable three-dimensional video image.

Moreover, the three-dimensional video image projecting device of the embodiment is characterized in that the three-dimensional video images, projected from the adjacent video image projector sets 20, are superimposed at the aforementioned superimposed portion of video image. If a displacement exists with a projection position between the superimposed portion of video image in the three-dimensional video images projected by one of the video image projector sets 20 and that projected by the other video image projector set, an appropriate three-dimensional video image may not be projected.

Therefore, at a management unit, an adjustment mode is provided for projecting, on the screen face S, a registration video image which is a video image of a lattice-like pattern with predetermined pitches, from each of the video image projector sets 20.

In particular, in the adjustment mode for projecting the registration video image, the first video image projector 20a in the video image projector set 20 serves to project a lattice-like pattern by a first color; the second video image projector 20b serves to project a lattice-like pattern by a second color and project the lattice-like patterns of the first color and the lattice-like patterns of the second color in a superimposed manner, and adjust the respective projection positions of the first video image projector 20a and the second video image projector 20b after superimposed on each other.

It is desirable that the first color and the second color are different from each other, and, in the embodiment, for example, the first color is blue, the second color is red, and a whitened lattice-like pattern is formed when the lattice-like patterns of the first color and the lattice-like patterns of the second color are superimposed on each other.

Figure 6C:
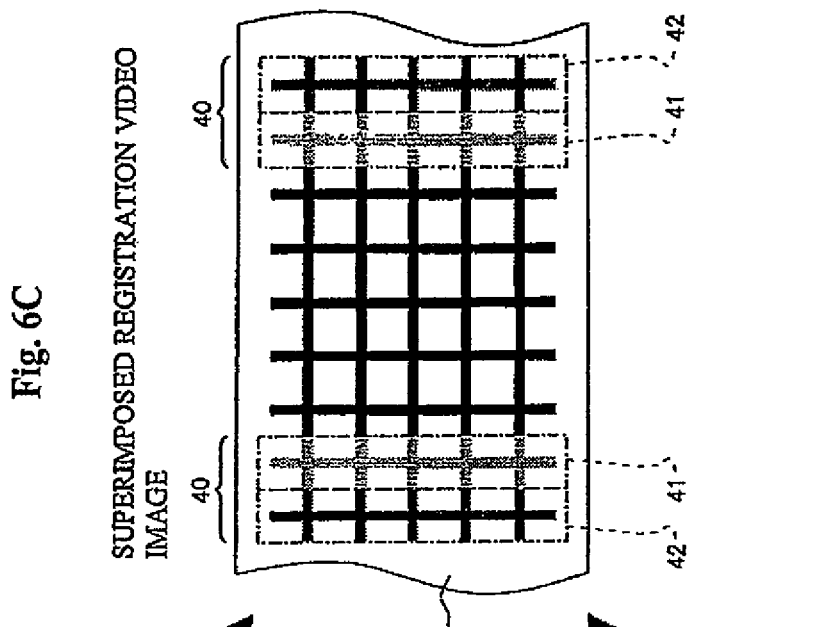
FIGS. 6A to 6C They are explanatory views of a registration video image projected on a screen face in an adjustment mode.
Figure 6A:
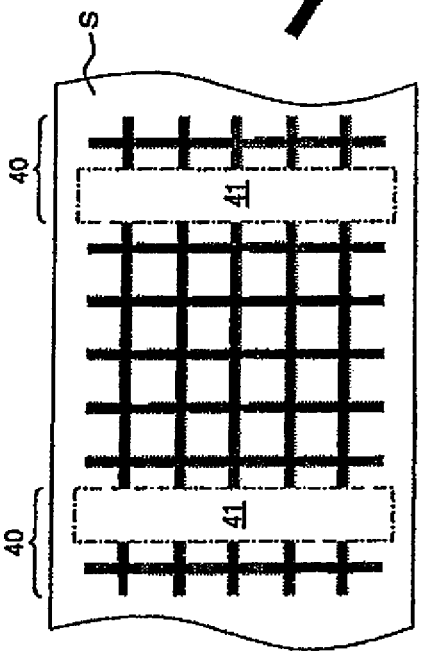
Figure 6B:
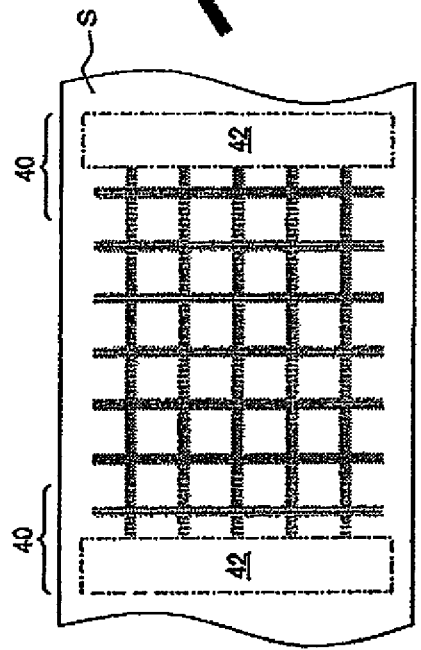

In order to perform registration of the adjacent three-dimensional video images, as shown in FIG. 6, for a registration video image of the first video image projector 20a projected as the lattice-like pattern of the first color, a first defective area 41 including a defective lattice-like pattern is provided at a superimposed portion of video image 40 provided at a side-edge portion in the circumferential direction side. In the embodiment, the first defective area 41 is a substantially halved area which is a little to the center of a registration video image at the superimposed portion of video image 40, and is provided in rectangle slices.

Further, as shown in FIG. 6, for a registration video image of a second video image projector 20b projected as a lattice-like pattern of a second color as well, a second defective area 42 including a defective lattice-like pattern is provided at a superimposed portion of video image 40 provided at the side-edge portion in the circumferential direction side. In the embodiment, the second defective area 42 is a substantially halved area which is a little to the side-edge in the circumferential direction of the registration video image at the superimposed portion of video image 40, and is provided in rectangle slices.

By providing the first defective area 41 and the second defective area 42, each of the first video image projectors 20a of the adjacent video image projector sets 20 allows the lattice-like pattern of the other superimposed portion of video image 40 to be superimposed on their first defective area 41, and performs registration of the adjacent three-dimensional video images by means of superimposition of the lattice-like patterns in this defective area.

In particular, in the embodiment, by superimposing the registration video image of the first video image projector 20a and the registration video image of the second video image projector 20b on each other, as shown in FIG. 6, a red lattice-like pattern is projected in the first defective area 41 at the superimposed portion of video image 40, and a blue lattice-like pattern is projected in the second defective area 42 at the superimposed portion of video image 40, thereby producing a registration video image.

The registration video image, with the blue lattice-like pattern and the red lattice-like pattern being provided at the superimposed portion of video image 40, is projected from each of the video image projector sets 20, whereby, on the blue lattice-like pattern of one of the adjacent registration video images, the red lattice-like pattern of the other one of the registration video images can be superimposed, and similarly, on the red lattice-like pattern of one of the adjacent registration video images as well, the blue lattice-like pattern of the other one of the registration video images can be superimposed.

Therefore, if no displacement occurs with the registration video images projected by the adjacent video image projector sets 20, respectively, a whitened lattice-like pattern can be uniformly projected, allowing viewers to verify the fact that the positions of the images are correctly adjusted.

On the other hand, if a displacement has occurred to the registration video images projected by the adjacent video image projector sets 20, respectively, such a whitened lattice-like pattern cannot be projected at a displaced portion, whereby the displaced portion can be visually recognized very easily, allowing highly precise adjustment.

Therefore, a video image moving between the adjacent three-dimensional video images can be reasonably projected.

As described previously, while the embodiment explained a case in which the first polarizing filter and the second polarizing filter are employed for the three-dimensional viewing glasses, a three-dimensional video image may be projected using three-dimensional viewing glasses employing a blue filter in place of the first polarizing filter and a red filter in place of the second polarizing filter. However, while a three-dimensional video image of a color video image can be viewed by the three-dimensional viewing glasses employing the first polarizing filter and the second polarizing filter, only a three-dimensional video image, as a monochrome video image, can be viewed by means of the three-dimensional viewing glasses employing the blue filter and the red filter.

The invention claimed is:

1. A three-dimensional video image projecting device comprising:
    a screen formed in a cylindrical shape with an inner circumferential face being a screen face; and
    a plurality of video image projectors arranged above the screen in a circumferentially spaced-apart manner, the plurality of video image projectors projecting a three-dimensional video image, which is capable of being three-dimensionally viewed through three-dimensional glasses having a first polarizing filter and a second polarizing filter arranged thereon and which is defined by and which comprises a plurality of adjacent and combined images that each comprise a plurality of adjacent and combined divisional images per projection of the plurality of video image projectors, to the screen face of the screen respectively in which the plurality of video image projectors face the screen face in an opposed manner so as to form three-dimensional video images that are circumferentially contiguous with each other on the screen face, a first overlapping portion being formed on the side edge portions of each said combined image of said respective three-dimensional video images, the respective combined images being combined with each other so that the overlapping portions of the combined images are superimposed on each other, and a second overlapping portion being formed on side edge portions of each divisional image, the divisional images being combined with each other so that the overlapping portions of the divisional images are superimposed on each other.

2. The three-dimensional video image projecting device according to claim 1, wherein:

a respective one of the video image projectors has an adjustment mode for projecting a registration video image with a lattice-like pattern of predetermined pitches on the screen face in order to perform registration with the three-dimensional video images projected adjacently;

a defective area including at least a defective part of the lattice-like pattern is provided at a superimposed portion of video image provided at a side-edge portion on a circumferential direction side of the registration video image; and the defective area is provided at a position which superimposes on the lattice-like pattern of the superimposed portion of video image with a defective area of registration video images projected adjacently.

3. The three-dimensional video image projecting device according to claim 2, wherein:

a video image projector for projecting either one of a video image for a left eye and a video image for a right eye is adapted to project the lattice-like pattern in the registration video image with a first color; and a video image projector for projecting an other one of the video images is adapted to:

project the lattice-like pattern in the registration video image with a second color after being superimposed on the lattice-like pattern of the first color;

project the lattice-like pattern of the second color in a defective area in a first registration video image projected as the lattice-like pattern of the first color;

project the lattice-like pattern of the first color in a defective area in a second registration video image projected as the lattice-like pattern of the second color;

superimpose a defective area in which the lattice-like pattern of the first color in a registration video image is projected adjacently on the defective area in which the lattice-like pattern of the second color is projected; and superimpose a defective area in which the lattice-like pattern of the second color in a registration video image is projected adjacently on the defective area in which the lattice-like pattern of the first color is projected.

4. The three-dimensional video image projecting device according to claim 1, wherein:

a blue filter is employed in place of the first polarizing filter, and a red filter is employed in place of the second polarizing filter.

5. A method for projecting a three-dimensional video image, comprising:

disposing a screen formed of a cylindrical body with an inner circumferential face being a screen face;

disposing a plurality of video image projectors above the screen in a circumferentially spaced-apart manner;

projecting a three-dimensional video image which is capable of being three-dimensionally viewed through three-dimensional glasses having a first polarizing filter and a second polarizing filter arranged thereon and which is defined by and which comprises a plurality of adjacent and combined images that each comprise a plurality of adjacent and combined divisional images per projection of the plurality of video image projectors to the screen face of the screen from the plurality of video image projectors, respectively, so that the plurality of video image projectors face to the screen face in an opposed manner so as to form three-dimensional video images that are circumferentially contiguous with each other on the screen face;

forming a first overlapping portion on side edge portions of each of the combined images and combining the combined images with each other so that the overlapping portions of the combined images are superimposed on each other; and forming a second overlapping portion on side edge portions of each of the divisional images and combining the divisional images with each other so that the overlapping portions of the divisional images are superimposed on each other.

* * * * *